United States Patent
Stelzer et al.

(10) Patent No.: US 8,353,758 B2
(45) Date of Patent: Jan. 15, 2013

(54) AMUSEMENT DEVICE HAVING ELECTRONIC GAME AND JUKEBOX FUNCTIONALITIES

(75) Inventors: James R. Stelzer, Holland, PA (US); Colin Higbie, Reva, VA (US); Nathan Weyer, Trevose, PA (US); William L. Layne, IV, Langhorne, PA (US)

(73) Assignee: AMI Entertainment Network, Inc., Bristol, PA (US)

( * ) Notice: Subject to any disclaimer, the term of this patent is extended or adjusted under 35 U.S.C. 154(b) by 701 days.

(21) Appl. No.: 12/212,196

(22) Filed: Sep. 17, 2008

(65) Prior Publication Data

US 2009/0075726 A1    Mar. 19, 2009

Related U.S. Application Data

(60) Provisional application No. 60/973,008, filed on Sep. 17, 2007.

(51) Int. Cl.
*G06F 17/00* (2006.01)

(52) U.S. Cl. ............... 463/25; 463/16; 463/20; 463/43; 463/44

(58) Field of Classification Search ............ 463/16, 463/20, 25, 42–47; 273/148 B; 345/156, 345/169, 173–179, 905; 715/727–729, 864; 710/1, 5, 8; 713/1, 600; 370/342–344
See application file for complete search history.

(56) References Cited

U.S. PATENT DOCUMENTS

| | | | |
|---|---|---|---|
| 4,856,787 A * | 8/1989 | Itkis | 273/237 |
| 5,575,717 A * | 11/1996 | Houriet et al. | 463/1 |
| 5,743,799 A * | 4/1998 | Houriet et al. | 463/25 |
| 6,336,219 B1 * | 1/2002 | Nathan | 725/91 |
| 6,578,051 B1 * | 6/2003 | Mastronardi et al. | 1/1 |
| 6,645,078 B1 * | 11/2003 | Mattice | 463/42 |
| 6,755,744 B1 * | 6/2004 | Nathan et al. | 463/42 |
| 7,549,919 B1 * | 6/2009 | Nathan et al. | 463/9 |
| 7,780,166 B1 * | 8/2010 | Paxton et al. | 273/145 C |
| 7,789,748 B2 * | 9/2010 | Landrum et al. | 463/20 |
| 7,992,178 B1 * | 8/2011 | Nathan et al. | 725/93 |
| 8,103,589 B2 * | 1/2012 | Nathan et al. | 705/51 |
| 2002/0138594 A1 * | 9/2002 | Rowe | 709/219 |
| 2002/0151327 A1 * | 10/2002 | Levitt | 455/556 |
| 2002/0160826 A1 * | 10/2002 | Gomez et al. | 463/16 |
| 2003/0064805 A1 * | 4/2003 | Wells | 463/39 |
| 2003/0073478 A1 * | 4/2003 | Kovacs | 463/16 |
| 2003/0073489 A1 * | 4/2003 | Hecht et al. | 463/35 |
| 2003/0083943 A1 * | 5/2003 | Adams et al. | 705/14 |
| 2003/0119575 A1 * | 6/2003 | Centuori et al. | 463/20 |
| 2003/0199295 A1 * | 10/2003 | Vancura | 463/16 |

(Continued)

*Primary Examiner* — William Brewster
*Assistant Examiner* — Jason Skaarup
(74) *Attorney, Agent, or Firm* — Panitch Schwarze Belisario & Nadel LLP

(57) ABSTRACT

An amusement device has a display, an audio output, and an input component. The display includes a touchscreen. The input component receives at least one of currency, coins, and credit cards/debit cards. The amusement device also includes a common controller. The common controller is configured to select and play at least one electronic game and to select and retrieve for playing a music data set from a plurality of music data sets. The electronic game and the music data set may optionally be played simultaneously. In certain embodiments, a reward based on one of either the electronic game or selection of the music data set is applied to the respective other of the electronic game and the selection of the music data. In further embodiments, a content of the electronic game is based on the music data set.

18 Claims, 4 Drawing Sheets

U.S. PATENT DOCUMENTS

| | | | |
|---|---|---|---|
| 2004/0053695 A1* | 3/2004 | Mattice et al. | 463/42 |
| 2004/0092315 A1* | 5/2004 | Boyd et al. | 463/42 |
| 2004/0142747 A1* | 7/2004 | Pryzby | 463/35 |
| 2004/0192443 A1* | 9/2004 | Stelzer et al. | 463/42 |
| 2005/0024343 A1* | 2/2005 | Collins | 345/173 |
| 2005/0051021 A1* | 3/2005 | Laakso | 84/615 |
| 2005/0054431 A1* | 3/2005 | Walker et al. | 463/25 |
| 2005/0059492 A1* | 3/2005 | Hedin et al. | 463/42 |
| 2005/0060405 A1* | 3/2005 | Nathan et al. | 709/225 |
| 2005/0064935 A1* | 3/2005 | Blanco | 463/35 |
| 2005/0125833 A1* | 6/2005 | Nathan et al. | 725/95 |
| 2005/0261063 A1* | 11/2005 | Boyd et al. | 463/42 |
| 2005/0277469 A1* | 12/2005 | Pryzby et al. | 463/35 |
| 2006/0062094 A1* | 3/2006 | Nathan et al. | 369/30.06 |
| 2006/0154727 A1* | 7/2006 | Okuniewicz | 463/42 |
| 2006/0239131 A1* | 10/2006 | Nathan et al. | 369/30.06 |
| 2006/0252473 A1* | 11/2006 | Stelzer et al. | 463/1 |
| 2007/0006708 A1* | 1/2007 | Laakso | 84/1 |
| 2007/0111791 A1* | 5/2007 | Arbogast et al. | 463/40 |
| 2007/0173309 A1* | 7/2007 | Rigsby | 463/16 |
| 2008/0086379 A1* | 4/2008 | Dion et al. | 705/14 |
| 2008/0102961 A1* | 5/2008 | Hedin et al. | 463/42 |
| 2008/0168359 A1* | 7/2008 | Flick et al. | 715/748 |
| 2008/0188291 A1* | 8/2008 | Bonney et al. | 463/25 |
| 2008/0239887 A1* | 10/2008 | Tooker et al. | 369/30.06 |
| 2008/0280669 A1* | 11/2008 | Kane et al. | 463/20 |

* cited by examiner

AMUSEMENT DEVICE HAVING ELECTRONIC GAME AND JUKEBOX FUNCTIONALITIES

CROSS-REFERENCE TO RELATED APPLICATIONS

This application claims the benefit of U.S. Provisional Patent Application No. 60/973,008, filed on Sep. 17, 2007, entitled "Amusement Device Having Electronic Game and Jukebox Functionalities," the contents of which are incorporated by reference herein.

BACKGROUND OF THE INVENTION

An embodiment of the present invention relates generally to an electronic amusement device, and more particularly, to an electronic amusement device having a controller for selecting and playing at least one electronic game and for selecting and playing a music data set from a plurality of music data sets.

Amusement devices having electronic games for computers and touchscreens or other types of amusement devices are generally well known in the art. Amusement devices, such as game machines, which allow a user to select games from a video display are well known in the art, such as those disclosed in U.S. Pat. Nos. 4,856,787 ("Itkis"); 5,575,717 ("Houriet, Jr., et al."); 5,743,799 ("Houriet, Jr., et al."), the entire contents of which are incorporated by reference herein, each of which shows a touchscreen for making a game selection from a menu of games. Such game machines or amusement devices typically operate upon input of currency (i.e., coin, token, paper money, credit/debit cards or the like) and are installed in locations such as bars, restaurants, airports, shopping malls, video arcades, casinos or the like. The game choices may include card games, sports games, games of skill, games of chance, action games, trivia games, or the like.

Jukeboxes having a plurality of songs available for selection and play are also generally well known in the art. As with game amusement devices, jukeboxes typically operate upon input of currency and are installed in locations such as bars, restaurants, airports, shopping malls, video arcades, casinos or the like. Upon receipt of currency, a user is prompted to select one or more songs for play, typically over a public speaker system installed in the location of the jukebox. Originally, the music selections were provided on 45 rpm records that were played by an automated turntable in the jukebox. The vinyl records were eventually replaced by compact discs (CDs) and the turntable replaced by a CD player. More recently, jukeboxes have become computerized, capable of playing selections of music as MP3 files, streaming audio data sets, or the like.

Game amusement devices and jukeboxes have generally been installed as two separate entities, with each having its own cabinet, for example. This is inconvenient for a user engaging the amusement device who desires to make a song selection on the jukebox, as the user must abandon the amusement device and risk turning it over to another player. One solution has been to put a controller of the amusement device in communication with a controller of the jukebox. The user of the amusement device may then access the jukebox through the amusement device interface and make a song selection. It has also been suggested to place both controllers into one cabinet and similarly allow communication between the amusement device controller and jukebox controller. Both systems are disclosed in commonly assigned U.S. Patent Application Publication No. 2005/0059492 ("Hedin"), the contents of which are incorporated by reference herein.

It is desirable to provide an amusement device with a common or shared controller for enabling a user to select and play an electronic game and to select and retrieve for playing a music data set from a plurality of music data sets. It is further desirable to allow the amusement device and jukebox functionalities to share content, rewards, or the like.

BRIEF SUMMARY OF THE INVENTION

Briefly stated, an embodiment of the present invention comprises an amusement device that includes a display, an audio output, and an input component. The display includes a touchscreen. The input component receives at least one of currency, coins, and credit cards/debit cards. The amusement device also includes a common controller. The common controller is configured to select and play at least one electronic game and to select and retrieve for playing a music data set from a plurality of music data sets. The music data set may optionally be streamed to the controller or entirely downloaded to the controller.

In a preferred embodiment of the present invention, the electronic game and the music data set are played simultaneously. In further preferred embodiments, a reward based on one of either the electronic game or selection of the music data set is applied to the respective other of the electronic game and the selection of the music data. In a still further preferred embodiment, a content of the electronic game is based on the music data set.

Another embodiment of the present invention comprises a method of playing an amusement device. The amusement device includes a display, an audio output, and an input component that receives at least one of currency, coins, and credit cards/debit cards. The method includes selecting and playing, by a common controller, at least one electronic game and selecting and retrieving for playing, by the common controller, a music data set from a plurality of music data sets.

Yet another embodiment of the present invention comprises an amusement device that includes a display, an audio output, and an input component. The display has a touchscreen. The input component receives at least one of currency, coins, and credit cards/debit cards. The amusement device also includes a common controller. The common controller is configured to select and play at least one electronic game and to select, retrieve, and play a music data set from a plurality of music data sets.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1A:
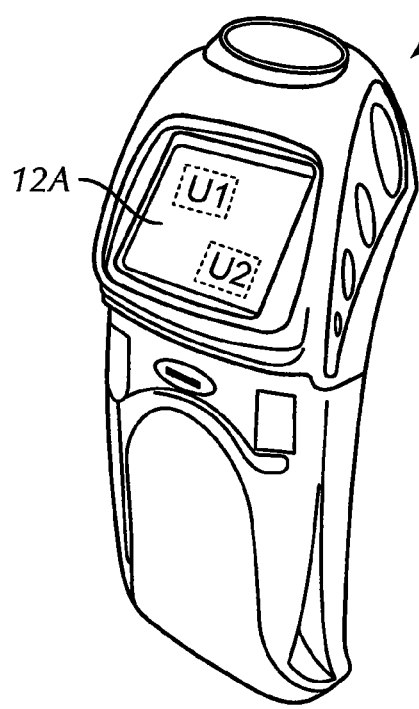
FIG. 1A is a perspective view of an amusement device in accordance with a first preferred embodiment of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the portable amusement device and designated parts thereof. The terminology includes the above-listed words, derivatives thereof, and words of similar import. Additionally, the words "a" and "an", as used in the claims and in the corresponding portions of the specification, mean "at least one." Further, the terms "coin" or "currency" should not be construed as limiting and can be used herein to mean all forms of coin and paper currency from any country as well as proprietary tokens, game cards, credit cards, debit cards, chits, or other representative forms of credit and/or payment.

Figure 1B:
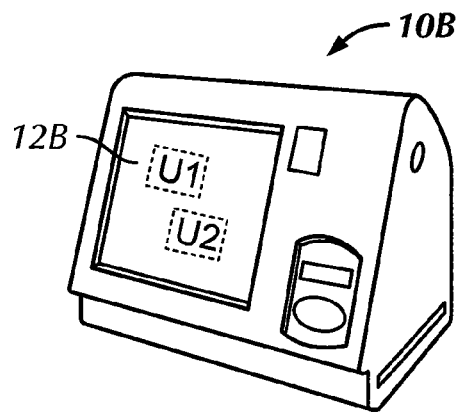
FIG. 1B is a perspective view of an amusement device in accordance with a second preferred embodiment of the present invention.
Figure 1C:
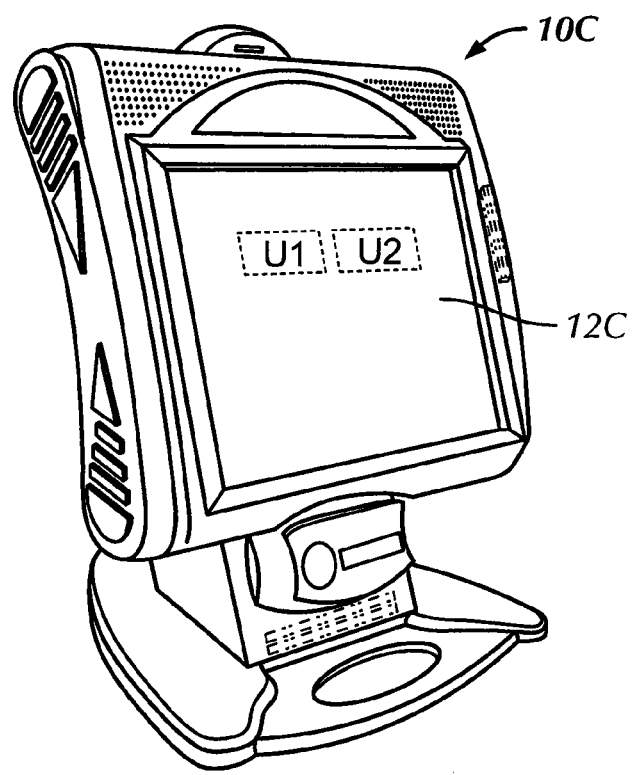
FIG. 1C is a perspective view of an amusement device in accordance with a third preferred embodiment of the present invention.

Referring to the drawings in detail, wherein like reference numerals indicate like elements throughout, there is shown in FIG. 1A a first preferred embodiment of an amusement device 10A. The amusement device 10A includes a common controller U1 and a memory U2. As used herein, controller U1 is referred to as "common" because it performs tasks for both game play and jukebox functionalities, as will be described in greater detail below. The memory U2 can be any known or suitable memory device such as random access memory (RAM), read only memory (ROM), flash RAM, hard disk, optical disk, or the like. The amusement device 10A further includes a video display 12A that is operatively connected to the common controller U1. FIG. 1B shows another or second amusement device 10B in accordance with a second preferred embodiment of the present invention. The second amusement device 10B also includes a common controller U1, a memory U2, and a display 12B. FIG. 1C shows another or third amusement device 10C in accordance with a third preferred embodiment of the present invention. The third amusement device 10C also includes a common controller U1, a memory U2, and a flat display 12C. Preferably, the video displays 12A, 12B, 12C are touchscreen video displays configured to accept touch input. The first amusement device 10A is a free-standing or floor-standing apparatus, whereas the second and third amusement devices 10B, 10C are table-top or counter-top apparatus. However, the amusement devices 10A, 10B, 10C may be arranged in any configuration including table mount, wall mount, pole mount, and the like without departing from the invention.

For convenience, the amusement devices 10A, 10B will be referred to hereinafter simply as "amusement device 10."

Figure 2:
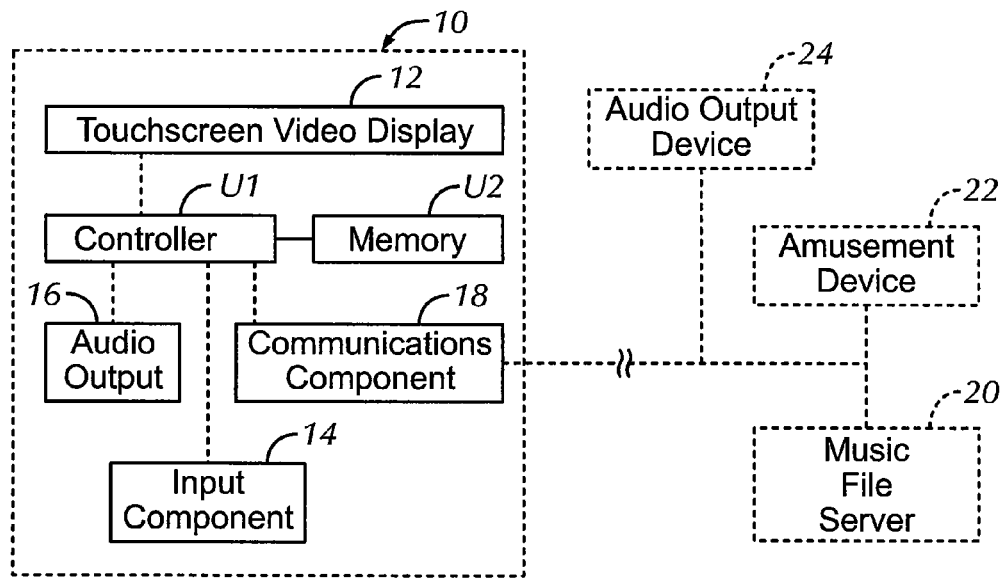
FIG. 2 is a block diagram of an amusement device and system in accordance with preferred embodiments of the present invention.

Referring to FIG. 2, the amusement device 10 is shown with the display 12, preferably touchscreen, being coupled to the common controller U1. Also coupled to the common controller U1 is an input component 14. Input component 14 may accept at least one of coins (or tokens), currency (e.g. paper money or the like), credit cards/debit cards, and the like. Although only one input component 14 is shown, the amusement device 10 may include more than one input component 14 to give a user an option for payment, for permitting multiple players, or the like. Preferably, the amusement device 10 is made operable upon actuation of the input component 14, for example, the user may only select and play an electronic game or select and retrieve for play a music data set once payment has been made via the input component 14 and/or one or more credits are issued to the user. However, free selections may be offered at the discretion of an operator of the amusement device 10.

The amusement device 10 also includes an audio output 16 coupled to the common controller U1. The audio output 16 may comprise one or more speakers internally housed by the amusement device 10. The audio output 16 may also comprise one or more sockets for connection to one or more speakers, headphones, or the like, that may be attached externally to the amusement device 10. Additionally, the audio output 16 may comprise one or more sockets for connection to an external audio system (not shown), such as a stereo, wall-mounted speakers, surround sound system, or the like. Volume may be controlled by an external control or an on-screen volume control manipulated via the touchscreen display 12.

The amusement device 10 also includes a communications component 18, such as an Ethernet port, a wireless transceiver, or the like. Using the communications component 18, the amusement device 10 may communicate with other devices or file servers, access the Internet, communicate over wide area networks (WANs) or local area networks (LANs), or the like. For example, the communications component 18 may couple the common controller U1 of the amusement device 10 to a remote music data server 20. Similarly, the amusement device 10 may connect with a second amusement device 22 using the communications component 18. The second amusement device 22 optionally includes the same components and features as amusement device 10. The amusement device 10 might also utilize an external audio output device 24 for outputting music data over the communications component 18.

Turning now to the operation of the amusement device 10, the memory U2 stores one or more electronic games and a system control program. However, the one or more electronic games may also be stored remotely. The common controller U1 controls the touchscreen display 12 based upon the system control program retrieved from the memory U2 and based upon inputs from the touchscreen display 12. As used herein, the system control program refers to all of the software functions outside of the electronic game files or music data including an operating system, display control, input control, sound drivers, and the like. Other input devices which may be connected to the amusement device 10 include a pushbutton(s), a track-ball or touchpad, a mouse, a joy-stick, a foot-pedal, a voice recognition system, a keypad or keyboard, and the like. But, preferably, the input device is the touchscreen display 12.

The amusement device 10 includes an operating mode and a setup mode. When the operating mode is selected, a player or user is selectively permitted to play electronic games and to select music data sets for play. When the setup mode is selected, the owner/operator is permitted to make system setup adjustments. To switch from the operating mode to the setup mode, a mode selector pushbutton (hardware not shown) is provided that is typically concealed from the users. The mode selector pushbutton may be implemented as a hidden software feature, but preferably the mode selector pushbutton is a simple pushbutton that is disposed inside a housing of the amusement device 10. In the setup mode, the owner/operator may also make adjustments to the game and music features as will be described in greater detail hereinafter.

In the preferred embodiments of the present invention, the common controller U1 controls the display 12 based upon the system control program retrieved from the memory U2 and based upon inputs of the user. The common controller U1 is configured to (i) select and play at least one electronic game and (ii) select and retrieve for playing a music data set from a plurality of music data sets. The common controller U1 also preferably plays the music data set. However, this function may also be performed by a separate controller (not shown) dedicated to decoding and playing of music data. The common controller U1 is preferably a single processing unit, but may comprise multiple processing units. For example, common controller U1 may include a main processing unit for controlling basic functionality of the amusement device 10 and a dedicated communication processing unit for handling transactions of the communications component 18.

Figure 3:
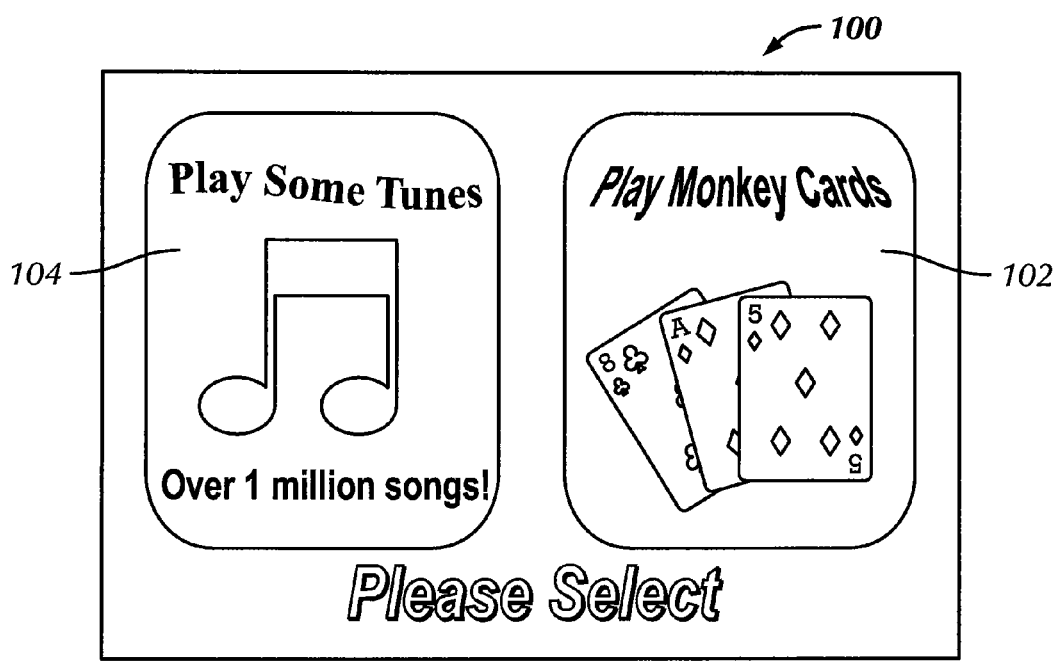
FIG. 3 is a screenshot of a menu displayed on the amusement device in accordance with preferred embodiments of the present invention.

FIG. 3 shows a screenshot 100 of a menu with an input 102 allowing a user to select and play a game, and an input 104 allowing a user to select a song from a collection of songs. By selecting the song input 104, a user is taken to a menu of playable songs and may select as many as desired, depending of course on how many credits the user has been granted and the number of credits required per song. Each song is stored as a "music data set." A music data set includes at least the audio data required for playing the song, but may also include metadata, i.e., information about the song such as artist, title, album, run time, or the like. The music data set is preferably stored remotely, for example, on a music data server 20 or a second amusement device 22 (FIG. 2) and can be retrieved over a broadband connection to a WAN, LAN, or the like. Optionally, the music data or a subset of the most commonly played music data can be stored locally and updated from time to time based upon play metrics or the like.

The music data set may be streamed to the common controller U1. The music data is provided serially to a temporary memory of common controller U1 and the music data is played as packets of music data are being received. The data does not necessarily remain in memory once it has been played. The data is preferably buffered such that a minor interruption in the data download does not cause an interruption in the song performance.

In preferred embodiments of the present invention, the music data set is not played until some specified portion of the music data set has been downloaded to the temporary memory, depending on the bandwidth of the communication path available for download, processor and/or memory speed, and the like. For example, the song may not begin until 10% of the music data set has been received at the common controller U1. The specified portion of the music data set may be set by an operator of the amusement device 10 as a standard. The figure may also be adjusted dynamically by the common controller U1 based on current perceived network download rates and/or prior download times, or the like. A combination of both methods can similarly be utilized.

The common controller U1 may additionally dynamically adjust the total download amount based on current conditions. For example, if a song fails, it may be required that 15% more of the music data be downloaded to common controller U1 before the song continues. Alternatively, if the total download is greatly exceeding the play rate, the download speed may be reduced. Preferably, the percentage of the music data set left to play should exceed the percentage of the music data left to download by about 10%. If a user selects a plurality of music data sets to be played, it is preferable to begin playing the first song and continue downloading the others. Downloading of the music data sets may occur sequentially or in parallel.

Conversely, it may be desirable to allow the entire music data set or total selected data sets to download to the temporary memory of the common controller U1 before the music data set is played. This at least ensures that a song will not be interrupted by intermittent lapses in connectivity or other network disruptions. In either case, should a music data set suffer a severe enough interruption, one or more unplayed song credits may be returned to the user as a courtesy.

Figure 4:
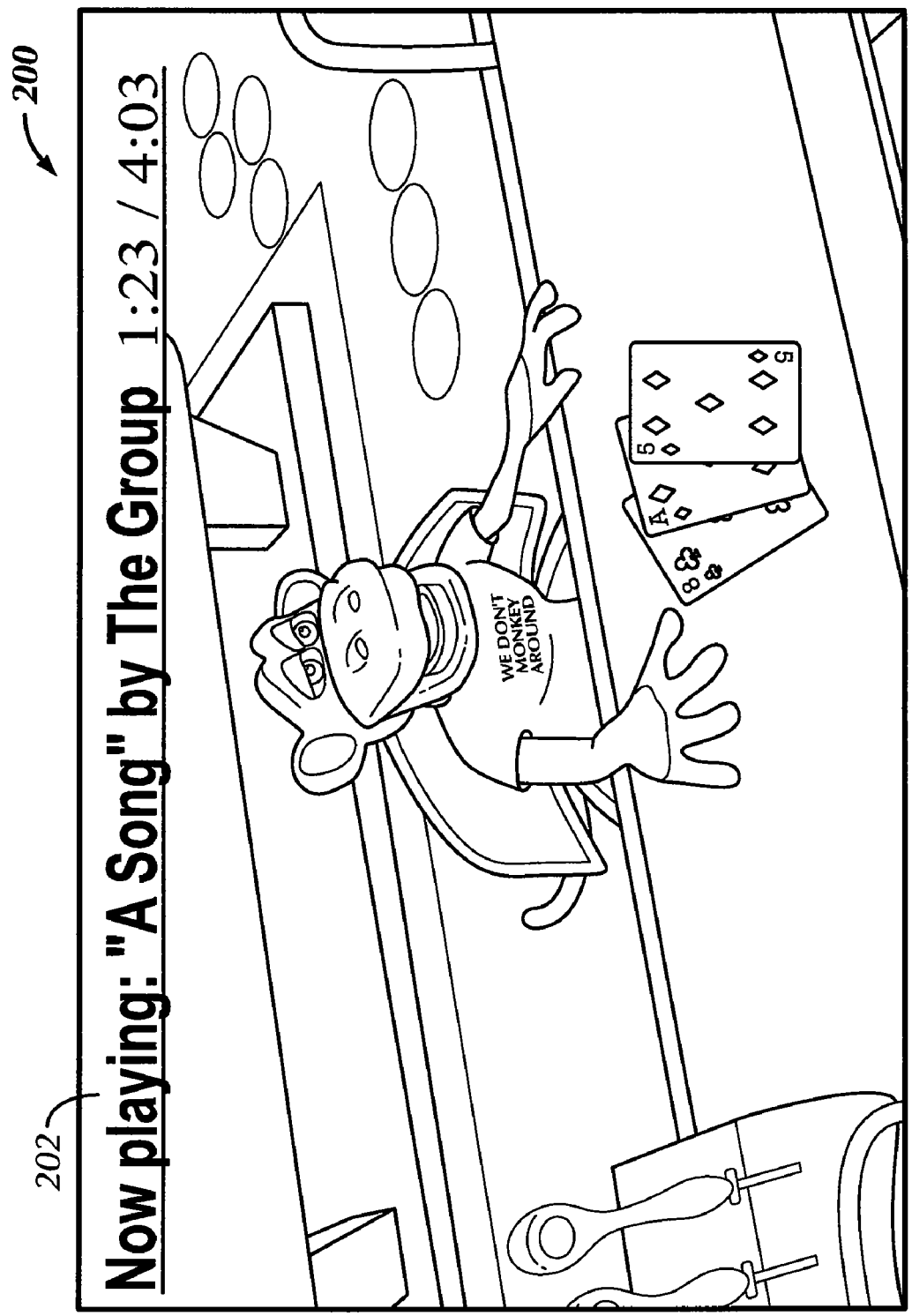
FIG. 4 is a screenshot of game and musical selection displayed on the amusement device in accordance with preferred embodiments of the present invention.

It is preferable that the electronic game and the selected music data set be capable of simultaneous play. A user should not have to choose between playing a game and listening to music. However, it is contemplated that the amusement device 10 may be configured to prevent games and music from being played concurrently. FIG. 4 shows a screenshot 200 of a game in progress while simultaneously a music data set is playing. The display 12 may optionally provide the user with song information, which may be encoded as metadata in the music data set, as discussed above. For example, status bar 202 shows the current song, the artist, and time remaining. Other information may be provided to the user, but should be done in a manner that is least intrusive to the user's enjoyment of the game. It is also contemplated that a user may cancel unplayed music selections and the amusement device 10 converts at least a portion of the unused credits to gameplay credits, the user may cancel unplayed game credits that the amusement device converts to music selection credits, or alternatively returns money to the user.

In addition, a user may be permitted to temporarily pause a game in order to access the music feature of the amusement device 10. For example, a user may be in the middle of a game when the song selections have finished playing on the amusement device 10. Rather than waiting for the game to end, or prematurely terminating a game, the user may put the game on hold in order to make further music data set selections. Following the music selection, the user may resume the game.

An operator of the amusement device 10 may wish to encourage more business by offering rewards for achieving threshold levels of use. For example, a user selecting a certain number of songs to play on the amusement device may be awarded an additional free song selection. Similarly, a user achieving a certain level in a game or playing a game a certain number of times may be awarded an additional free play.

Figure 5:
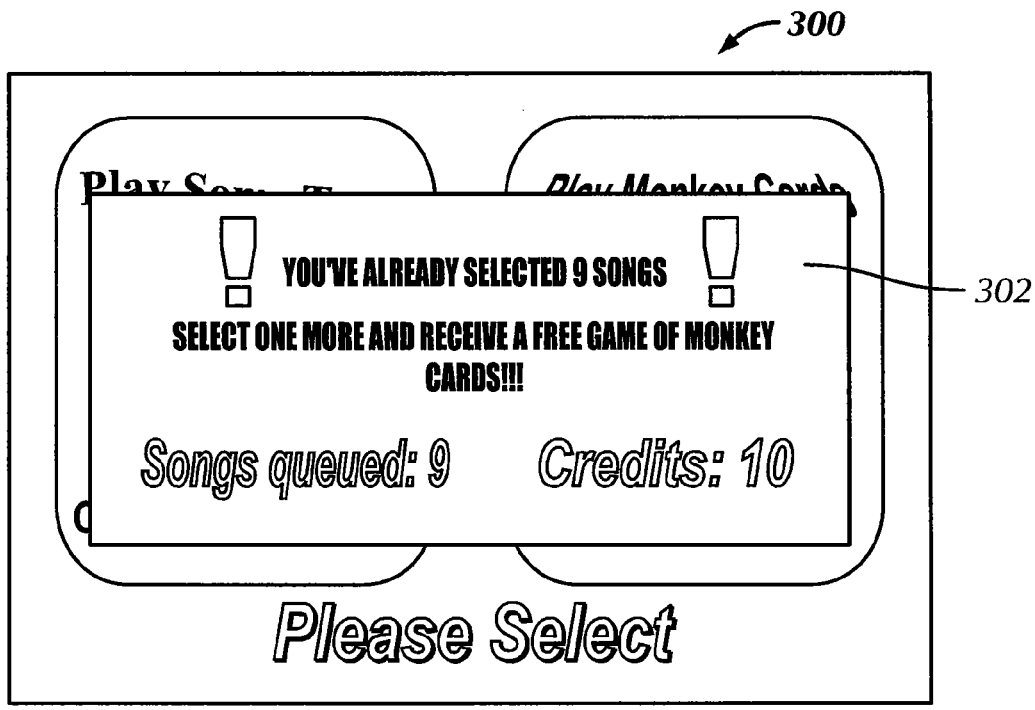
FIG. 5 is a screenshot of an alert notifying a user of potential rewards displayed on the amusement device in accordance with preferred embodiments of the present invention.

Preferably, the amusement device 10 promotes cross-use of music and game play features through rewards. For example, FIG. 5 shows a screenshot 300 including a pop-up window 302 with a reward message for the user. In this instance, a user has selected nine music data sets or songs for play on the amusement device 10. The pop-up window 302 informs the user that if a tenth song is selected for play, the user will be entitled to a free game. Alternatively, a user achieving a high score in the game may be entitled to a free music data set selection. It will be appreciated that these examples are in no way limiting and that there are a number of different methods of offering cross-promotional rewards between the music data set selection and electronic game play that may be encompassed by embodiments of the present invention.

Figure 6:
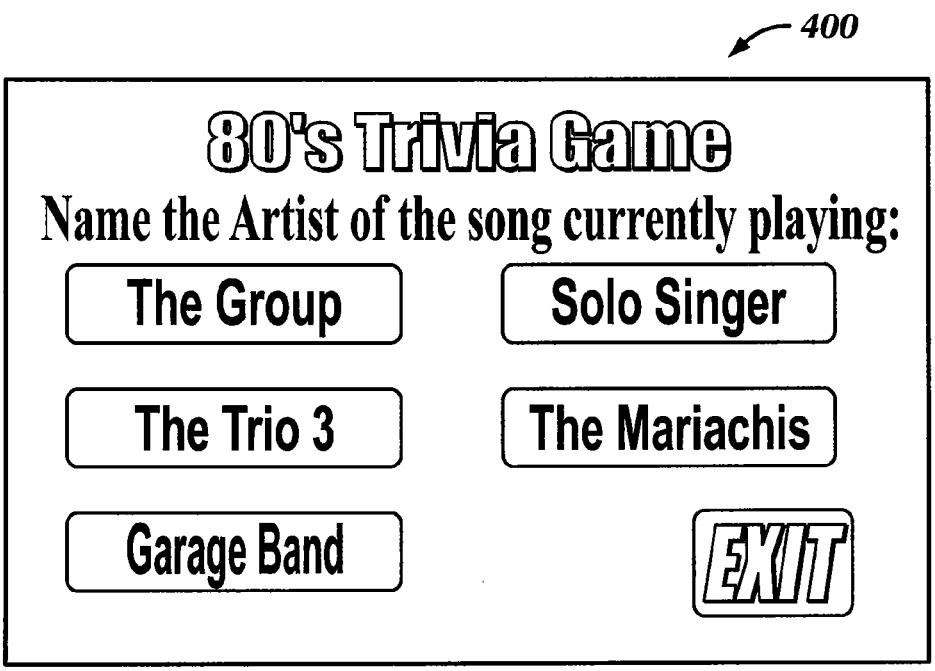
FIG. 6 is a screenshot of an example of shared game and music content displayed on the amusement device in accordance with preferred embodiments of the present invention.

In addition, it is contemplated that the music feature and game play feature on the amusement device 10 may share content. For example, FIG. 6 shows a screenshot 400 of a trivia game question posited to the user. The question is based on the music data set (by way of the metadata) currently being played, specifically, the name of the artist of the current song. In this instance, a prior user may have selected this song for play and the common controller U1 recognizes the song as a candidate for a trivia question, or the song may be triggered to play as a part of the game. It will be appreciated that these examples are in no way limiting and that there a number of different methods of sharing content between the music data set feature and electronic game play feature that may be encompassed by embodiments of the present invention.

Game play sounds are typically played through an internal speaker or the like of a game amusement device while jukeboxes often are wired to broadcast music throughout the entire location, such as a restaurant. The amusement device 10 according to embodiments of the present invention may play the game sounds and music data selections through audio output 16 such that all audio emanates locally from the cabinet of the amusement device 10. However, as described above, the audio output 16 may be a socket (digital or analog) for outputting the audio to externally placed speakers or a sound system. Additionally, the amusement device 10 may be in communication with other remote audio output devices 24 or other amusement devices 22 for outputting the audio. Preferably, only music data is output remotely for a broadcast, as game audio does not typically provide a desired atmosphere for other patrons. Likewise, the amusement device 10 may include one set of speakers for game sounds and a second, more powerful set of speakers for music play. The amusement device 10 may also be configured to receive an additional amplifier and speaker set to increase the wattage of audio output and provide better sound.

Embodiments of the present invention also include methods of playing an amusement device 10 as described above.

The amusement device 10 may also include other functionality and features such as video jukebox, multimedia player, Internet browsing, broadcast media viewing, time based rental mode, non-prize tournaments, prize-based tournaments, head-to-head competitions, prize-based lotteries, ticket dispensing, prize dispensing, debit/credit card charging, phone card dispensing, e-mail, photography, placing customer orders, communicating with other amusement devices, and the like.

The amusement device 10 may also provide for remote or local access for accounting and/or bookkeeping purposes. The amusement device 10 may include a local connector for uploading to a hand-held or portable computer or removable memory for receiving accounting or other data. The amusement device 10 may include accounting and bookkeeping screens accessible by an operator through set up screens and/or through password protection.

From the foregoing, it can be seen that embodiments of the present invention comprise an amusement device having a controller configured for selecting and playing an electronic game and selecting and playing a music data set. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An amusement device comprising:
   (a) a display having a touchscreen;
   (b) an input component for receiving at least one of currency, coins, and credit cards/debit cards;
   (c) an audio output; and
   (d) a common controller communicatively coupled to the display and the audio output and being configured to:
      (i) select and play at least one electronic game using the display,
      (ii) select, retrieve, and play via the audio output a music data set from a plurality of music data sets, the music data set being streamed to the common controller, the music data set not being played until a specified portion of the music data set is downloaded to the common controller, the specified portion of the music data set being one of:
         (A) set by an operator,
         (B) dynamically adjusted based on a current download rate and prior downloads, and
         (C) a combination of (A) and (B), and
      (iii) prevent concurrent play of the at least one electronic game, via the controller and the display, with play of the music data set, via the controller and the audio output.

2. An amusement device comprising:
   (a) a display having a touchscreen;
   (b) an input component for receiving at least one of currency, coins, and credit cards/debit cards;
   (c) an audio output; and
   (d) a common controller communicatively coupled to the display and the audio output and being configured to:
      (i) select and play at least one electronic game using the display,
      (ii) select and retrieve for playing via the audio output a music data set from a plurality of music data sets, the music data set being streamed to the common controller, the music data set not being played until a specified portion of the music data set is downloaded to the common controller, the specified portion of the music data set being one of:
         (A) set by an operator,
         (B) dynamically adjusted based on a current download rate and prior downloads, and
         (C) a combination of (A) and (B), and
      (iii) prevent concurrent play of the at least one electronic game, via the controller and the display, with play of the music data set, via the controller and the audio output.

3. The amusement device of claim 1, wherein interruption of the stream of the music data set causes one or more unplayed song credits to be returned to a user of the amusement device.

4. The amusement device of claim 1, wherein a reward based on the at least one electronic game is applied toward selection of one or more music data sets.

5. The amusement device of claim 1, wherein a reward based on selection of one or more music data sets is applied toward the at least one electronic game.

6. The amusement device of claim 1, wherein the music data set is entirely downloaded to the controller.

7. The amusement device of claim 6, wherein interruption of the music data set download causes one or more unplayed song credits to be returned to a user of the amusement device.

8. The amusement device of claim 6, wherein a reward based on the at least one electronic game is applied toward selection of one or more music data sets.

9. The amusement device of claim 6, wherein a reward based on selection of one or more music data sets is applied toward the at least one electronic game.

10. The amusement device of claim 1, wherein at least one of the at least one electronic game and the music data set is stored remotely and is retrieved by the controller over one of a wide area network and a local area network.

11. The amusement device of claim 10, wherein the music data set is stored on one of a central server and a second amusement device.

12. The amusement device of claim 1, wherein the audio output is housed by the amusement device.

13. The amusement device of claim 12, wherein the audio output includes an amplifier and at least one speaker.

14. The amusement device of claim 1, wherein a content of the at least one electronic game is based on the music data set.

15. The amusement device of claim 1, wherein the audio output is configured to connect to one of an amplified sound system, headphones, and at least one speaker.

16. The amusement device of claim 1, wherein the controller is further configured to perform at least one of selecting and playing a video file, browsing the Internet, sending electronic mail, placing orders, and communicating with other amusement devices.

17. A method of playing an amusement device, the amusement device having a display, an audio output, an input component for receiving at least one of currency, coins, and credit cards/debit cards, and a common controller communicatively coupled to the display and the audio output, the method comprising:
  (a) selecting and playing, by the common controller of the amusement device, at least one electronic game using the display;
  (b) selecting and retrieving for playing via the audio output, by the common controller of the amusement device, a music data set from a plurality of music data sets, the music data set being streamed to the common controller, the music data set not being played until a specified portion of the music data set is downloaded to the common controller, the specified portion of the music data set being one of:
    (i) set by an operator,
    (ii) dynamically adjusted based on a current download rate and prior downloads, and
    (iii) a combination of (i) and (ii); and
  (c) preventing, by the common controller, concurrent play of the at least one electronic game, via the controller and the display, with play of the music data set, via the controller and the audio output.

18. The method of claim 17, wherein selecting and retrieving a music data set from a plurality of music data sets includes retrieving the music data set from a remote location over one of a wide area network and a local area network.

* * * * *